United States Patent
Dwersteg (10) Patent No.: US 11,437,943 B2
(45) Date of Patent: Sep. 6, 2022

(54) METHOD AND CIRCUIT ASSEMBLY FOR THE RESONANCE DAMPING OF STEPPER MOTORS

(71) Applicant: Maxim Integrated Products, Inc., San Jose, CA (US)

(72) Inventor: Bernhard Dwersteg, Rellingen (DE)

(73) Assignee: Maxim Integrated Products, Inc., San Jose, CA (US)

( * ) Notice: Subject to any disclaimer, the term of this patent is extended or adjusted under 35 U.S.C. 154(b) by 166 days.

(21) Appl. No.: 16/632,360

(22) PCT Filed: Aug. 16, 2018

(86) PCT No.: PCT/DE2018/100718
§ 371 (c)(1),
(2) Date: Jan. 19, 2020

(87) PCT Pub. No.: WO2019/034212
PCT Pub. Date: Feb. 21, 2019

(65) Prior Publication Data
US 2020/0228036 A1    Jul. 16, 2020

(30) Foreign Application Priority Data
Aug. 17, 2017   (DE) ............... 10 2017 118 837.1

(51) Int. Cl.
*H02P 8/32* (2006.01)
(52) U.S. Cl.
CPC ..................... *H02P 8/32* (2013.01)
(58) Field of Classification Search
CPC ....................................................... H02P 8/32
See application file for complete search history.

(56) References Cited

U.S. PATENT DOCUMENTS 4,325,024 A * 4/1982 Heidenreich ........ G01R 19/252
324/111
4,682,092 A   7/1987 Pellegrino et al.
(Continued)

FOREIGN PATENT DOCUMENTS

EP   0833439 A1   4/1998
JP   H0795799 A   4/1995

OTHER PUBLICATIONS

International Search Report (dated Dec. 17, 2018) for corresponding International App. PCT/DE2018/100718.
(Continued)

*Primary Examiner* — Bickey Dhakal
*Assistant Examiner* — Devon A Joseph
(74) *Attorney, Agent, or Firm* — North Weber & Baugh LLP; Michael North (57) ABSTRACT

A method and a circuit arrangement for damping stepper motor resonances during operation of a stepper motor, in particular in the medium and high speed range, is described, wherein the coils of the stepper motor are each connected into a bridge circuit comprising semiconductor switches, in order to impress into the coils a predetermined target coil current. The resonance damping is achieved by activating a passive FD-phase in the zero crossing of the target coil current, during which all semiconductor switches are opened or switched blocking, in order to thereby feed a coil current flowing in the related motor coil back into the supply voltage source either via inverse or body diodes and/or via diodes connected in parallel to the semiconductor switches in the reverse direction between the positive supply voltage and ground potential.

12 Claims, 5 Drawing Sheets

(56) References Cited

U.S. PATENT DOCUMENTS

| | | | | |
|---|---|---|---|---|
| 4,908,562 A * | 3/1990 | Back | ............... | H02P 8/22 318/696 |
| 5,068,582 A * | 11/1991 | Scott | ............... | H02P 6/21 318/400.35 |
| 5,216,347 A * | 6/1993 | Pace | ............... | H02P 8/22 318/685 |
| 7,068,007 B2 * | 6/2006 | Silitonga | ............... | H02P 8/12 318/560 |
| 2007/0136538 A1 * | 6/2007 | Kresse | ............... | H04L 12/40 711/154 |
| 2011/0057600 A1 * | 3/2011 | Suda | ............... | H02P 8/12 318/696 |
| 2015/0303850 A1 * | 10/2015 | Nagaraj | ............... | H02P 7/29 318/696 |
| 2016/0218649 A1 * | 7/2016 | Hijikata | ............... | H02P 8/32 |
| 2016/0254767 A1 * | 9/2016 | Nagaraj | ............... | H02P 29/032 318/696 |
| 2016/0352272 A1 * | 12/2016 | Hijikata | ............... | H02P 8/16 |

OTHER PUBLICATIONS

Sorin Manea. "AN1307, Stepper Motor Control with dsPIC(R) DSCs" 9 Mar. 26, 2009 (Mar. 26, 2009), pp. DS01307A-I, Microchip AN1307, Microchip Technology Inc, Retrieved from the Internet: http://www.microchip.com/stellent/groups/techpub_s g/documents/appnotes/en546027.pdf [retrieved on Sep. 22, 2014] XP002730008 figure 11.

German Official Action (dated Aug. 6, 2018) for corresponding German App. 10 2017 118 837.1.

Jakoby, Walter: Automatisierungstechnik—Algorithmen und Programme. 1. Auflage. Berlin, Heidelberg: Springer-Verlag Berlin Heidelberg New York, 1996. S. 66, 152.—ISBN 978-3-840-60371-9.

Seite, Schrittmotor. In: Wikipedia, Die freie Enzyklopädie. Bearbeitungsstand: Jul. 31, 2017, 10:20 UTC. URL: https://de.wikpedia.org/w/index.php? title=Schrittmotor&oldid=167746457 (Abgerufen: Aug. 3, 2018, 13:45 UTC).

* cited by examiner

METHOD AND CIRCUIT ASSEMBLY FOR THE RESONANCE DAMPING OF STEPPER MOTORS

BACKGROUND AND SUMMARY

The invention relates to a method and a circuit arrangement for damping stepper motor resonances during the operation of a stepper motor, especially in a medium and high speed range.

It is well known that in stepper motors a magnetic rotor is rotated step by step by a corresponding angle by means of a controlled electromagnetic field generated by static motor coils and rotating step by step.

Often there is the desire to be able to rotate the motor with the smallest possible step angles in order to achieve the highest possible resolution or accuracy of positioning and a more uniform course of the torque curve. For this reason, the so-called micro-step mode is preferred to the known full-step and half-step mode, in which the currents flowing through the motor coils are not only switched on and off, but rise and fall in a certain way. The resolution and uniformity with which the stepper motor executes the micro-steps depends on how many different current amplitudes are used to control the motor coils and how precisely these can be maintained. A sinusoidal or cosinusoidal excitation of the motor coils is generally the most appropriate, since by this microstep-optimized motors can also achieve very continuous, i.e. jerk-free rotation and thus smooth motor running as well as high position resolution.

For the electrical control of stepper motors, in particular in micro-step operation, known chopper methods are used, for example, by means of which the current direction and current level or current form given at any given time by a specified current (target coil current) is impressed into each of the motor coils by means of PWM current pulses with the aid of a motor supply voltage (DC voltage) in order to drive the rotor of the motor with the rotating magnetic field induced thereby.

However, it has been shown that stepper motors can be subject to different resonances during operation, which vary greatly depending on the motor speed and which often cannot be sufficiently suppressed even when the motor is controlled by means of a chopper method.

In particular, undesired motor resonances can occur in the range of medium and high speeds and during speed jumps at which the torque of the motor decreases, which resonances can only be suppressed insignificantly even in micro-step operation. Furthermore, such resonances, especially at constant speed, can also be caused by beatings between speed and chopper frequency or by unfavourable feedback of the counter-EMF induced in the motor coils to the chopper control.

Even if these resonances generally have only low energy, in the unfavourable case they can build up over many 10 current periods and then lead to a step loss of the motor in the absence of damping.

These resonances could of course be avoided or reduced by doing without the relevant critical speed ranges or driving through them quickly or by taking other measures when designing the speed curve. Rubber dampers or suitable couplings could also be used on the mechanical side. However, all this is considered disadvantageous.

The prevention of resonances by means of encoder-based regulating processes is generally out of the question because the motors concerned are usually operated as purely controlled systems for cost reasons.

For the drive-side reduction of resonances, methods for counter-EMF-based detection and active damping of resonances or passive damping methods could be used, in which excess energy from the oscillations is either converted into thermal energy (internal motor resistance) or fed back into the supply voltage source of the motor. At medium and high speeds, however, this is not possible or only possible insufficiently compared to low speeds, since the electrical commutation frequency of a stepper motor then reaches a comparable order of magnitude of the typical chopper frequency, which is usually slightly above 16 kHz.

From the JP H07-95799A it is known that the currents flowing through a motor coil are switched by means of a bridge circuit consisting of four semiconductor switches and that all semiconductor switches are blocked at a given falling coil current and that the coil current is acceleratedly reduced by diodes connected in parallel to the semiconductor switches in order to enable a higher motor speed.

Furthermore, the US 2016/0352272 A1 provides a motor controller in which H-bridge circuits for the motor coils are switched to reduce the power dissipation in such a way that a coil current to be reduced is fed back into a power supply.

However, the above-mentioned problem of the formation of motor resonances is not dealt with in these publications.

It is desirable to provide a method and a circuit arrangement with which a stepper motor can be operated in a relatively simple manner, at least largely without resonance, especially in the medium and high speed range and especially in micro-step operating mode.

An aspect of the invention involves activating passive fast-decay (FD) phases in the zero crossing of a predetermined target coil current (and preferably in a region temporally surrounding this zero crossing), with which the actual coil current is very quickly reduced by feeding it back into the supply voltage source and is thereby substantially brought to the value zero, in order to largely avoid such resonances, in particular in the region of medium and high speeds at which the motor torque decreases and the motor is therefore particularly sensitive to resonances. This also dampens or suppresses load angle oscillations of the motor caused by resonances or speed jumps which lead to a counter-EMF induced in the coils.

Tests have shown that the passive FD phases can also be activated at each zero crossing of the target coil current independent of a momentary motor speed, without affecting the actual coil current in an undesirable way in the low or medium speed range.

To activate the passive FD phases, the motor coils are preferably each connected in a semiconductor bridge circuit, via which a supply voltage +VM of a supply voltage source is applied to the motor coils, in order to impress the predetermined target coil current values with predetermined polarity into the motor coils for each point in time by correspondingly opening and closing the semiconductor switches (e.g. MOSFETs). The passive FD phases are then preferably activated by opening or blocking all semiconductor switches in the zero crossing of the target coil current (and preferably in a region temporally surrounding this zero crossing) and thereby feeding back the actual coil currents which then still flow either via the inverse or body diodes which are intrinsically existing in the semiconductor switches, and/or via (external) diodes connected in parallel to the semiconductor switches in the reverse direction between the positive supply voltage +VM and ground, into the supply voltage source very quickly, and much faster than would be possible with an active FD phase described below.

Figure 4:
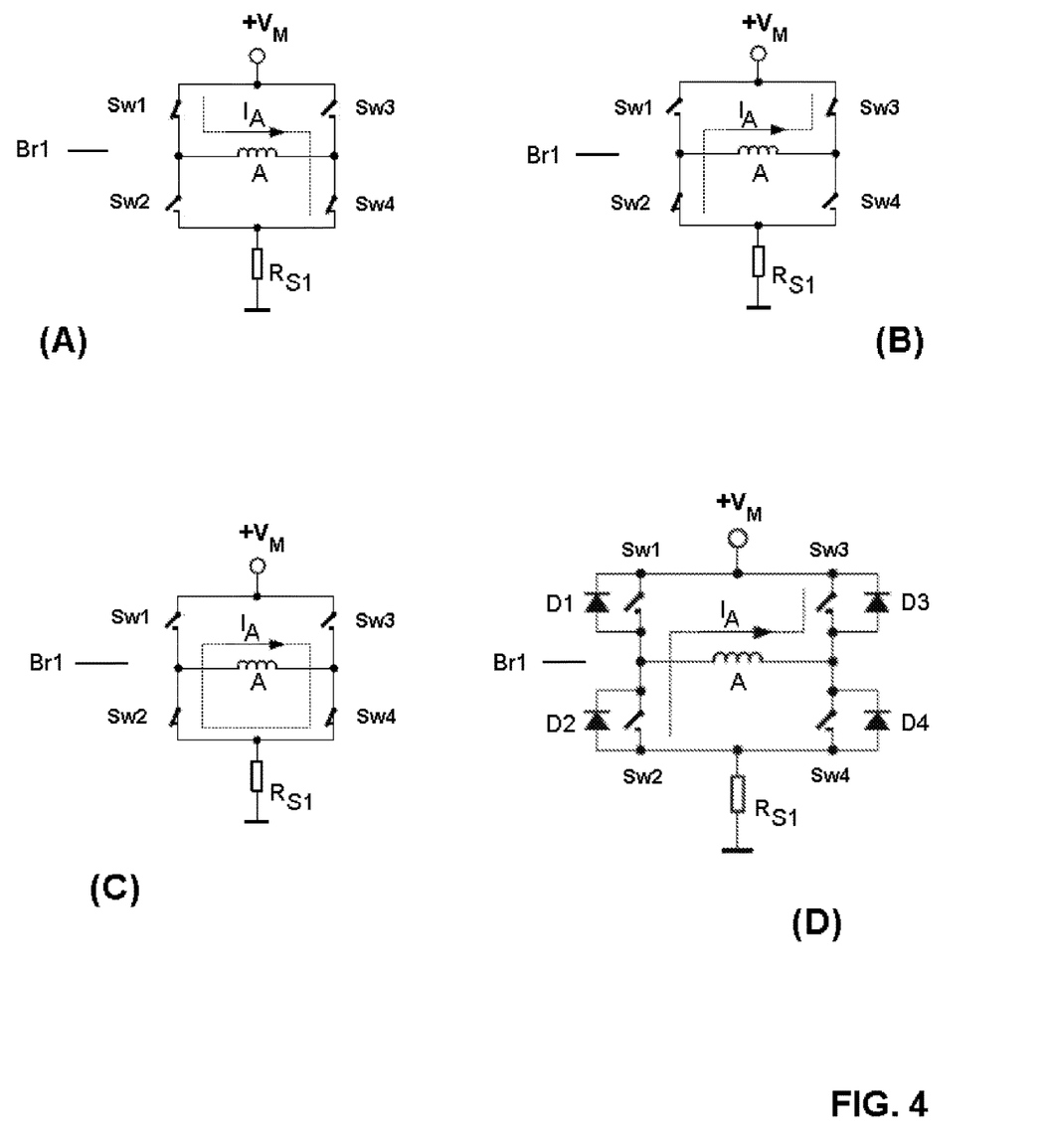
FIG. 4 circuit diagrams of different current flow phases in a motor coil during chopper operation.

These passive FD phases can preferably be implemented in combination with a chopper method mentioned above, in which the target coil current values preset for each point in time are impressed into the coils by activating ON-, active FD- and, if necessary, SD-phases. This will be explained in detail with reference to FIG. 4.

One advantage of these solutions is that the entire speed range made available by the motor can now be used at least largely resonance-free.

As already mentioned, the inventive solution is preferably used for micro-step operation, but can also be used for any other motor operation in which the coil current is not only switched on and off as in full-step operation, but is also impressed into the coils with increasing and decreasing current amplitudes or a plurality of current amplitudes between the value zero and the maximum permissible current value, as for example in half-step, quarter-step, eighth-step operation, etc.

The dependent claims disclose advantageous embodiments of the invention.

BRIEF DESCRIPTION OF THE DRAWINGS

Further details, characteristics and advantages of the invention result from the following description of preferred embodiments on the basis of the drawing. It shows.

DETAILED DESCRIPTION

Figure 1:
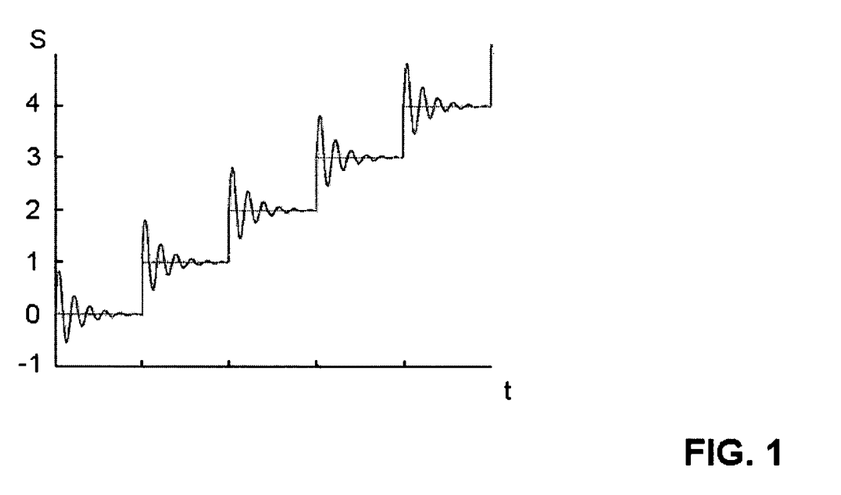
FIG. 1 resonances of a stepper motor in full-step operation.

To illustrate the problem underlying the invention, FIG. 1 shows the resonances of a stepper motor in full-step operation. The number of full steps S is plotted on the vertical axis and the time t is plotted on the horizontal axis. The Figure shows that after the execution of a step, the rotor performs resonant oscillations, the amplitudes of which can initially reach almost to the next or previous step position and then decay. Such behaviour can also occur in half-, quarter-, eighth-step operation etc. as well as in micro-step operation and results in a significant loss of torque and possibly also step losses.

Figure 2:
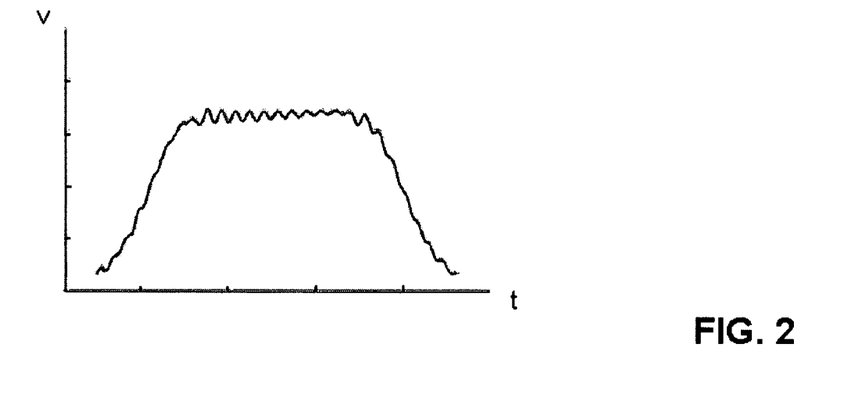
FIG. 2 a speed course which is subject to resonances.

FIG. 2 shows an example of a speed course of a stepper motor, where the speed v is plotted on the vertical axis and the time t is plotted on the horizontal axis. From this illustration it becomes clear that even with speed jumps such as the transition from an acceleration to a constant speed or number of revolutions of the motor shown here, the oscillations or resonances mentioned can occur and only gradually subside. Here, too, noticeable torque losses and possibly also step losses can occur.

Figure 3:
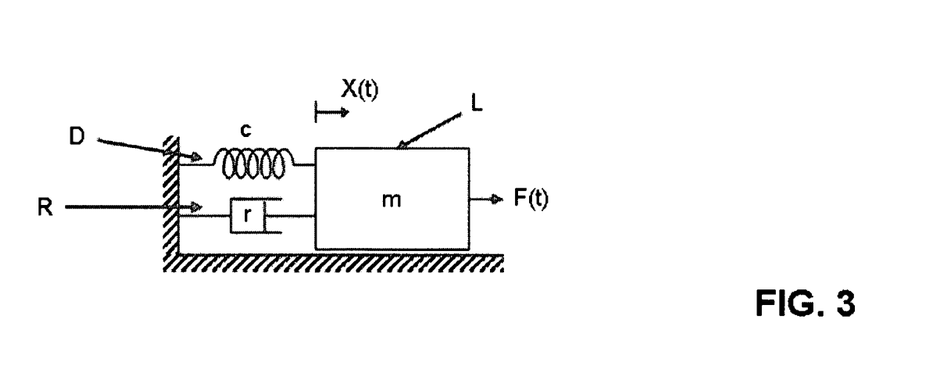
FIG. 3 a mechanical equivalent circuit diagram for a resonant state.

FIG. 3 shows a mechanical equivalent circuit diagram of this resonant motor behaviour. The load L of the motor corresponds to a mass m on which the torque D of the motor, corresponding to a spring with a spring constant c, acts on the one hand, and a friction R, corresponding to a damping element with a damping constant r, acts on the other hand, so that a force F(t) is exerted on the mass m which leads to a displacement X(t) of the mass m (corresponding to a motor rotation) in the form of a decaying oscillation.

FIGS. 4(A) to (D) show circuit diagrams with a motor coil A and coil currents IA in four different current flow phases.

These Figures show a bridge circuit Br1 from a first to a fourth switch Sw1, Sw2, Sw3, Sw4, where a first and a second switch Sw1, Sw2 as well as a third and a fourth switch Sw3, Sw4 are each connected in series and the two series connections are connected in parallel. The related motor coil A is connected to the centres of the bridge branches. The base of the bridge circuit is connected to ground via a resistor RS1 for sensing the actual motor current flowing through the motor coil, while the head of the bridge circuit is connected to the motor supply voltage source +VM. The switches Sw1, Sw2, Sw3, Sw4 are switched by means of a driver circuit to which chopper switching signals are fed for activating the current flow phases.

This means that the current actually flowing through the related motor coil A is measured, and this current is regulated in dependence on the measurement in positive and negative direction or polarity by means of current flow or chopper phases (ON, SD, FD) of a chopper method, which are suitably activated and timed by PWM control of the switches, in such a way that the actual coil current in each chopper phase and thus over its entire course at least largely corresponds to the course and the polarity of the related target coil current Isoll.

It is assumed that in the case of a sinusoidal coil current, the polarity of the coil current is positive in the first and second quadrants and negative in the third and fourth quadrants.

FIG. 4(A) shows the switch positions and the resulting direction of current flow IA from the supply voltage source +VM through the coil A to ground during a first chopper phase (ON-phase) in which this direction is the same as the momentary predetermined direction or polarity of the target coil current, the first and fourth switches Sw1, Sw4 being closed and the second and third switches Sw2, Sw3 being open.

During this ON-phase (positive switch-on phase), the coil current is actively impressed into a coil in the direction of the momentarily specified polarity or direction of the coil current, so that the coil current amount increases relatively quickly and continuously (switch-on period) until it has reached its momentary target value and the ON-phase is then terminated. The direction of the coil current impressed by an ON-phase is therefore equal to the momentary polarity or direction of the coil current.

FIG. 4(B) shows the switch positions and the resulting reversal of the polarity of coil A as well as the feedback of the coil current IA into the supply voltage source +VM, i.e. contrary to the momentarily given direction or polarity of the target coil current (which here is the same as in FIG. 4(A)) during a second chopper phase (active FD-phase), in which the first and fourth switches Sw1, Sw4 are open and the second and third switches Sw2, Sw3 are closed.

During this active FD-phase (negative switch-on phase), the coil current is actively reduced contrary to the momentarily given polarity of the target coil current by reversing the polarity of the coil and feeding the coil current back into the supply voltage source +VM until it has reached its momentary target value and the active FD-phase is then terminated. Alternatively, however, an active FD-phase can also be terminated unregulated after a predetermined period of time has elapsed with the aim of ensuring the maximum reduction of the coil current in a certain application in the respective active FD-phase on the basis of empirical values without actually measuring it. In any case, the active FD-phase serves to reduce the coil current relatively quickly, especially in the phases of decreasing coil current amount (i.e. during the second and fourth quadrants of a sinusoidal coil current).

FIG. 4(C) shows a third chopper phase (SD-phase) in which the coil A is short-circuited or bridged, i.e. the second and fourth switches Sw2, Sw4 are closed, while the first and third switches Sw1, Sw3 are open (or vice versa accordingly), so that the current IA flowing in the coil A gradually decays, i.e. recirculates, according to the internal resistance of the coil A.

During this SD-phase (recirculation phase), the related coil is not actively driven but short-circuited or bridged, so that the coil current decreases only gradually (i.e. slower than during the FD-phase) due to the internal resistance of the coil and the counter-EMF. In this phase, the coil current IA cannot usually be measured, so that the SD-phase must be terminated after a predetermined time period has elapsed, wherein the same constant time period is usually set for all SD-phases.

In summary, these three chopper phases are activated, combined and dimensioned temporally by chopper switching signals generated by the chopper and fed to a driver circuit for the motor coils in such a way that the actual coil current list is as close as possible to and exactly follows the related specified current (target coil current Isoll) for the corresponding motor coil over its entire (e.g. sinusoidal) course, i.e. during the rising and falling coil current phases.

This makes it possible to damp motor resonances sufficiently in most cases, especially in the low speed range where the counter-EMF of the motor (i.e. the voltage counter-induced in the coils by the rotor) is smaller than the supply voltage.

At medium and high speeds, at which the counter-EMF of the motor reaches or exceeds the level of the supply voltage, the target coil current can often only be imperfectly impressed into the coils with such a chopper method, so that the counter-EMF induced in the coils and the associated oscillations of the motor load angle or motor resonances cannot be damped by the chopper operation, or cannot be damped sufficiently. However, this can be achieved by activating passive FD-phases as shown in FIG. 4(D).

FIG. 4(D) shows the bridge circuit Br1 comprising the first to fourth switch Sw1, Sw2, Sw3, Sw4 as well as a first to fourth diode D1, D2, D3, D4, which are connected between the positive supply voltage source +VM and ground in the reverse direction, wherein one diode is parallel to one switch each, and in which all switches Sw1, Sw2, Sw3, Sw4 are open.

If semiconductor switches, in particular MOSFETs, are used as switches, the diodes D1 to D4 are implemented in the form of the inverse or body diodes intrinsically existing in the semiconductor switches. Alternatively or additionally, as shown, external diodes D1 to D4 connected in parallel to the switches can also be used.

With this circuit, by opening all switches Sw1, Sw2, Sw3, Sw4 in the zero crossing of the target coil current Isoll (and preferably in a temporal range surrounding this zero crossing), a passive FD-phase is activated in which the coil current IA is reduced via the diodes D4, D1 or D2, D3 and fed back into the supply voltage source +VM.

The duration of the passive FD-phase in the temporal range surrounding the zero crossing of the target coil current is preferably experimentally determined and fixed for a specific motor to be controlled. It can also be set by a user and, if necessary, adapted to a momentary motor load during motor operation, or remain constant regardless of the motor speed.

The passive FD-phases are preferably activated independently of a momentary motor speed at each zero crossing of the target coil current, i.e. even at low speeds. However, it would also be possible to activate passive FD-phases only if the motor reaches or exceeds a predetermined speed, in particular a medium speed, and/or performs a speed change per time unit which exceeds a predetermined limit value.

This passive FD-phase has the advantage that in case of a momentary target coil current value of zero, the actual coil current IA is reduced particularly quickly to this value of zero. As will be explained later in connection with the circuit arrangement, for these passive FD-phases the semiconductor switches are preferably not opened by driving the driver circuit Tr by means of the chopper as in the first to third chopper phase described above, but by a switching signal fed directly to the driver circuit Tr, so that no delays occur due to the corresponding generation of the chopper switching signals as in the first to third chopper phase.

In addition to the use of the intrinsically existing inverse or body diodes and/or the (external) diodes connected in parallel to the semiconductor switches as described above, this leads to a further acceleration of the activation of the passive FD-phases, which is advantageous for the suppression of motor resonances.

If the motor is subject to load angle oscillations due to resonances or jumps or steps in the drive speed (rotational speed), especially at medium and high rotational speeds as described above, this also leads to a corresponding variation of the counter-EMF, the level of which can reach and exceed the level of the supply voltage. During the passive FD-phase, this counter-EMF is also reduced very quickly, so that at the time of the zero crossing of the target coil current, the zero crossing of the actual coil current is forced or forced very quickly and independently of the momentary state of the chopper. The reaction time of the diodes can be neglected since it is in any case considerably shorter than the reaction time of the first to third chopper phase described above.

Thus, in total, each period of the actual coil current is composed of a plurality of chopper phases as shown in FIGS. 4(A) to 4(C) and the passive FD-phases as shown in FIG. 4(D), the latter being activated in the zero crossing region of the target coil current, so that a particularly precise zero crossing of the actual coil current is achieved and any motor resonances and load angle oscillations are effectively suppressed.

At low motor speeds, any resonances of the motor are well damped by the chopper phases mentioned, and the passive FD-phases have an almost negligibly small temporal portion, so that they have no influence on the impressing of clean sinusoidal current waves by the chopper phases and do not interfere with motor operation, especially since the passive FD-phases are only activated when the target coil current is zero or almost zero. At medium and high motor speeds, the relative temporal portion of the passive FD-phases automatically increases, since the zero crossings of the coil currents follow each other correspondingly faster, so that any oscillations or resonances of the motor are effectively damped.

Since the energy of the oscillations to be damped is relatively low compared to the power consumption of the coils, a temporal portion of the passive FD-phases of between about 5% and a few 10% of the duration of an electrical period of the target coil current has proven to be sufficient to effectively suppress such oscillations, especially at a desired, nominal, or for an application intended, or at a medium or maximum motor speed.

In the case of a high speed and a high motor load, it may occur that due to the associated large load angle, the zero crossing of the actual coil current considerably shifts in relation to the zero crossing of the target coil current, especially if the motor current cannot be controlled or reduced quickly enough for example by activating the active FD-phases (FIG. 4(B)). In this case, the passive FD-phase (FIG. 4(D)) activated in the zero crossing of the target coil current has no or only a slight immediate effect. However, if the motor is subject to oscillations, these oscillations are effectively damped by the passive FD-phases at the moment when the zero crossing of the actual coil current overlaps due to the displacement of the load angle caused by the oscillations, with the zero crossing of the target coil current.

Figure 5:
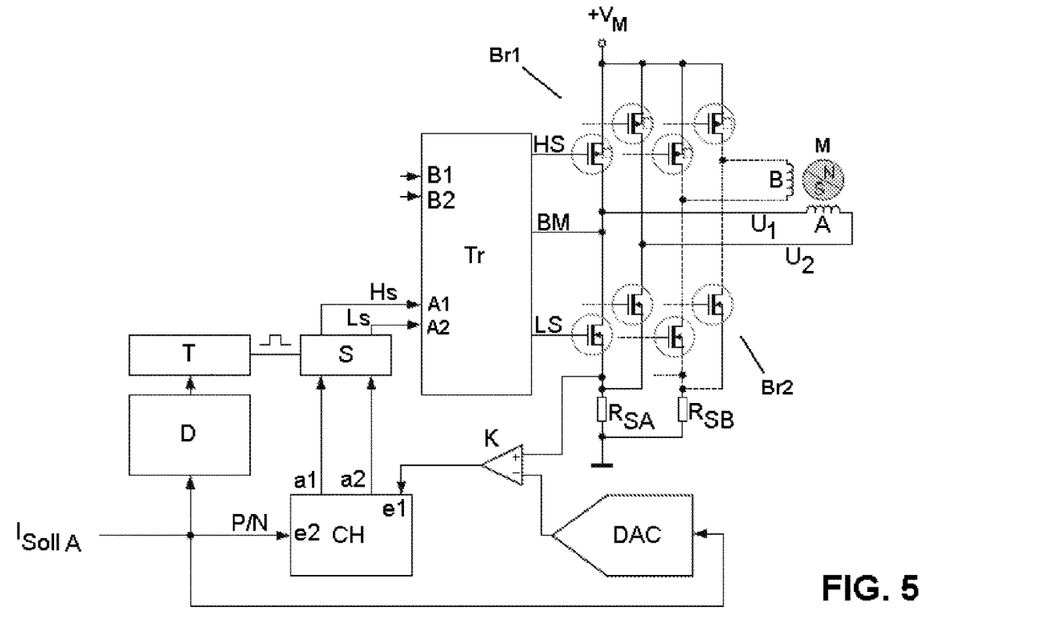
FIG. 5 a schematic diagram of an exemplary circuit arrangement for carrying out a method according to the invention.

FIG. 5 shows a block diagram of an exemplary embodiment of a circuit arrangement for carrying out the method according to the invention for one of the two coils A, B of a stepper motor.

The circuit arrangement comprises as components known per se an integrated motor-driver circuit Tr, with which a first bridge circuit Br1 connected between a supply voltage source +VM and ground is driven via first outputs HS (High Side), LS (Low Side) and BM (Bridge Centre), in order to switch the chopper phases as described above with reference to FIG. 4, and to impress the currents with corresponding polarities into a first coil A of the stepper motor M.

The actual coil current IA flowing through the first coil A is measured by the voltage drop at a first measuring resistor RSA at the base of the first bridge circuit Br1.

The second coil B of the motor M (in this example a 2-phase motor) is connected to a second bridge circuit Br2 with a second measuring resistor RSB, which is controlled as described above via second outputs HS (High Side), LS (Low Side) and BM (bridge Centre) of the driver circuit Tr, which are not shown here.

The method according to the invention can also be applied in a corresponding way to a 3-phase or a multi-phase motor with a correspondingly higher number of motor coils into which the coil currents are impressed as explained above using the method according to the invention.

The components of the circuit arrangement according to the invention with which the driver circuit Tr is controlled via its inputs A1, A2 and which are described in the following, are only shown for one of the two coils (namely a first coil A) of the stepper motor M. These components must therefore be implemented once again for the other motor coil B (and possibly for each additional motor coil in the case of a multi-phase stepper motor) and have to be connected to the corresponding inputs B1, B2, . . . of the driver circuit Tr.

The positive or negative voltage, which drops according to the momentary polarity of the actual coil current at the measuring resistor RSA, is fed to a first input of a comparator K, the second input of which is connected to the output of a digital-to-analogue converter DAC, with which the supplied target coil current values ISollA for the first coil A, preferably generated in the digital domain, are converted into analogue voltage values, in order to compare a momentary actual coil current value with the momentary target coil current value ISollA. If the target coil current values ISollA are supplied in analogue form, the digital-to-analogue converter DAC is of course not required.

As an alternative and corresponding to the detection shown by means of a comparator K, the actual coil currents could also be detected via an ADC (analogue-to-digital converter) in order to carry out the signal processing completely in the digital domain.

The output signal at the output of the comparator K is fed to a first input e1 of a chopper circuit CH.

A signal P/N indicating the specified direction (polarity) of the momentary target coil current value ISollA is applied to a second input e2 of the chopper circuit CH.

The chopper circuit CH generates the chopper switching signals at outputs a1, a2 as a function of the output signal of the comparator K, for example in the form of PWM pulses Hs, Ls, which are transmitted via a switching device S to inputs A1, A2 of the driver circuit Tr and with which the driver circuit Tr opens and closes the semiconductor switches of the first bridge circuit Br1 in such a way that, as has been explained above with reference to FIGS. 4(A) to 4(C), the actual coil current course flowing through the first motor coil A corresponds at least substantially to the supplied target coil current course ISollA. The same applies accordingly to the second motor coil B and the control of the second bridge circuit Br2 by means of chopper switching signals which are fed to the inputs B1, B2 of the driver circuit Tr.

The circuit arrangement further comprises a detector D for a current zero crossing, to the input of which the supplied target coil current values ISollA are applied, a timer T, preferably in the form of a monoflop, the input of which is connected to an output of the detector D, and the switching device S having first inputs which are connected to the outputs a1, a2 of the chopper circuit CH, and a second input (control input), to which a control output of the timer T is applied. The outputs of the switching device S are connected to the inputs A1, A2 of the driver circuit Tr.

Thus, if detector D detects a zero crossing of the target coil current course ISollA, it generates a trigger signal at its output, which starts the timer T. The timer T then generates at its control output a control signal preferably having a predetermined duration, for example in the form of a logical "1" level, which is fed to the switching device S. This control signal causes the switching device S to interrupt the chopper switching signals supplied by the outputs a1, a2 of the chopper circuit CH during the presence of the control signal, and instead to apply a zero crossing signal to the inputs A1, A2 of the driver circuit Tr, with which all switches (MOSFETs) of the first bridge circuit Br1 are opened or are switched to the high-impedance or blocking state so that, as shown in FIG. 4(D), the passive FD phase for the first coil A of motor M is activated nearly without any delay and thus substantially faster than would be possible by driving the driver circuit Tr by means of the chopper circuit CH. The same accordingly applies to the second and any further coils of the motor.

As soon as the predetermined duration has expired, the timer T switches off the control signal again or generates a logical "0" level at its output. Thus the switching device S switches through the chopper switching signals at the outputs a1, a2 of the chopper circuit CH again to the inputs A1, A2 of the driver circuit Tr, so that the first bridge circuit Br1 is controlled again according to FIGS. 4(A) to 4(C).

If these passive FD-phases are each to be activated in a temporal range surrounding the zero crossing of the target coil current and thus to be activated also before the zero crossing is reached, the momentary target coil current values ISollA are preferably compared in the zero crossing detector D with a corresponding threshold value, wherein the trigger signal is generated when the values fall below this threshold value.

Both this threshold value and the time duration for which the control signal is generated at the output of the timer T and by this a passive FD-phase is activated, can either be given constantly (e.g. for a specific motor type) or adjustable by a user. In particular, they can be adapted to the motor parameters and/or an actual motor load and/or an actual motor speed.

FIGS. 6 to 10 show temporal oscillograms of the actual (measured) coil current IA and the actual (measured) coil voltages U1, U2 at the two terminals of coil A, each in relation to ground potential, for different speed ranges, wherein within the time ranges marked by A1, B1, C1 and D1 each a passive FD-phase according to FIG. 4(D) is activated and thus the coil voltages U1, U2 correspond to the respective induction voltage of the motor, which is generated in the inductance of the coil or due to the counter-EMF of the motor during these time periods.

The passive FD-phases can also be recognized by the fact that the coil voltages U1, U2 are not firmly coupled to ground potential or the positive supply voltage, but increase (first coil voltage U1) or decrease (second coil voltage U2) sharply by the diode voltage with the activation of the passive FD-phase, and can take intermediate levels during the duration of a current-free coil.

Outside the time ranges A1, B1, C1 and D1, the coil voltages U1, U2 at the terminals of the coil result from the switching of the switches Sw1, . . . Sw4 of the bridge circuit Br1 by means of the chopper switching signals Hs, Ls generated by the chopper circuit CH according to FIGS. 4(A) to 4(C). These time ranges will not be discussed further below. With the oscillograms only the effect of the passive FD-phases in different speed ranges and load states of the motor is to be clarified.

Figure 6:
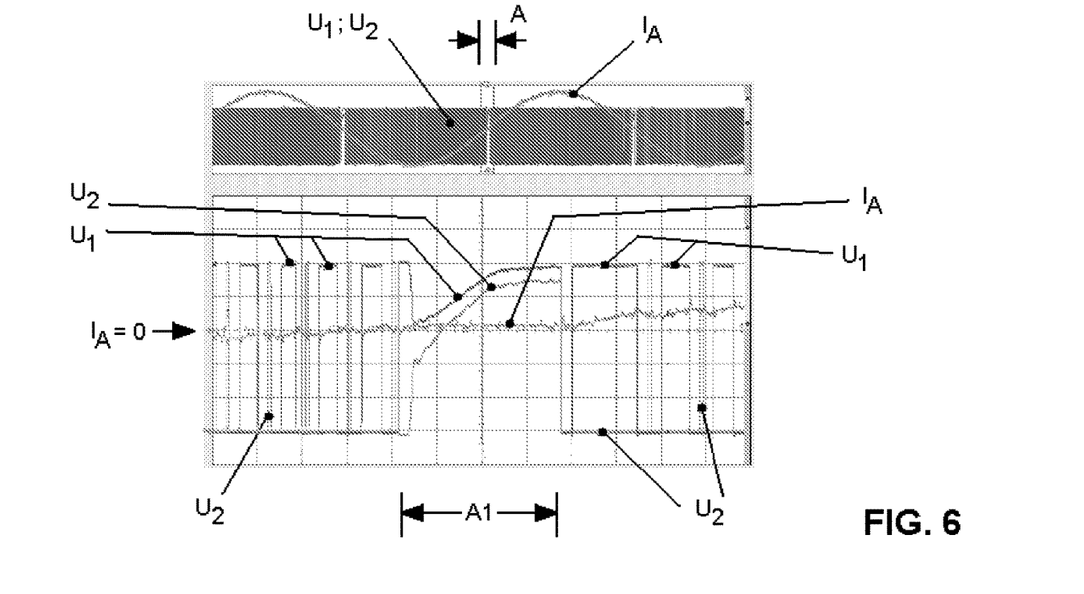
FIG. 6 measured courses of coil current and coil voltages at low speed.

FIG. 6 shows the oscillograms at a low motor speed and without or only a small motor load.

The time range marked with the letter "A" in the upper part of FIG. 6 is expanded in the lower part. The term "A1" denotes the passive FD-phase which is activated by the timer T and which in this case corresponds to the zero crossing of the actual coil current IA, the zero crossing being along the line marked by IA=0.

At the beginning of the time range A1, the actual coil current IA is fed back to the supply voltage source +VM. This can be recognized by the fact that, as mentioned above, the coil voltages U1 and U2 are each slightly above or below the voltage range (namely that of the supply voltage) visible in previous chopper cycles. The difference of approximately 0.7 Volt is due to the diode flux voltage of the MOSFET switches Sw1, . . . Sw4 used in the bridge circuit Br1. The feedback decays within the time range A1 of the passive FD-phase, so that the actual coil current IA becomes zero and the coil voltages U1, U2 show, after initial feedback, only a small difference due to the counter-EMF. The termination of the passive FD-phase is shown in the oscillograms by the steep drop of the two coil voltages U1 and U2.

Figure 7:
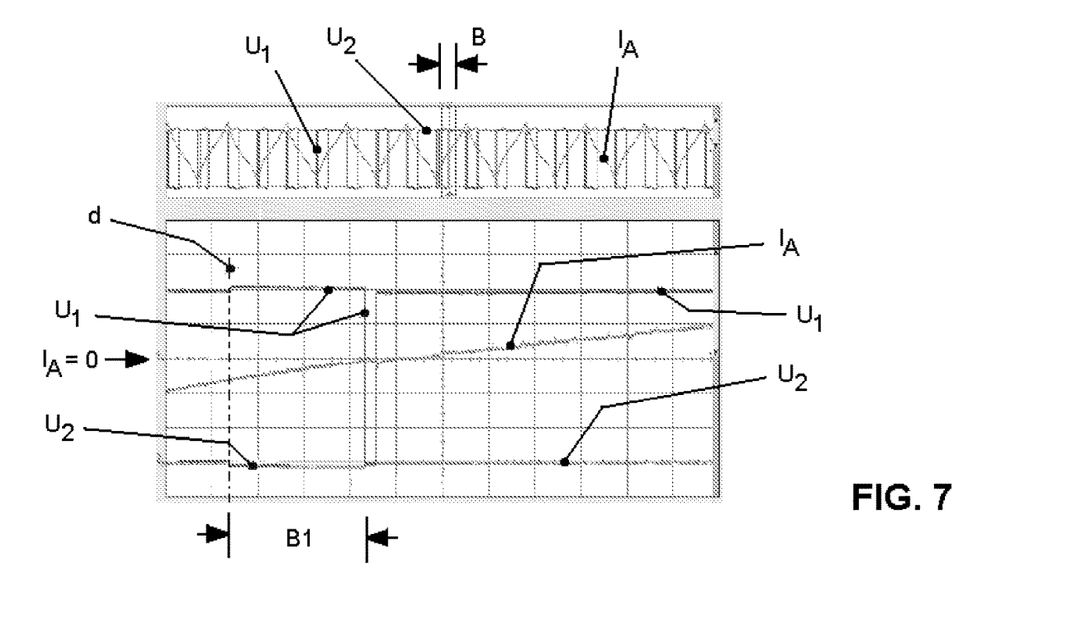
FIG. 7 measured courses of coil current and coil voltages at medium speed without motor load.

FIG. 7 shows the oscillograms of the measured coil current IA and of the coil voltages U1, U2 measured at the terminals of coil A at a medium motor speed and without a motor load. The time range marked with the letter "B" in the upper part of FIG. 7 is shown expanded in the lower part.

The term "B1" refers to the passive FD-phase activated by the timer T, where the start of an FD-phase leads to the jump points in the course of the coil voltages U1, U2 marked with a dotted line d, and the end of the passive FD-phase results in a steep drop in the coil voltage U1.

In this case, the passive FD-phases have no influence on the actual coil current IA, the zero crossing of which, due to the very small load angle in the measured situation, is only slightly lagging behind the target coil current ISollA and is only reached after the end of the passive FD-phase (time range B). This illustration makes it particularly clear that the passive FD-phase not only has no influence on the coil current IA, but also no interference occurs.

Figure 8:
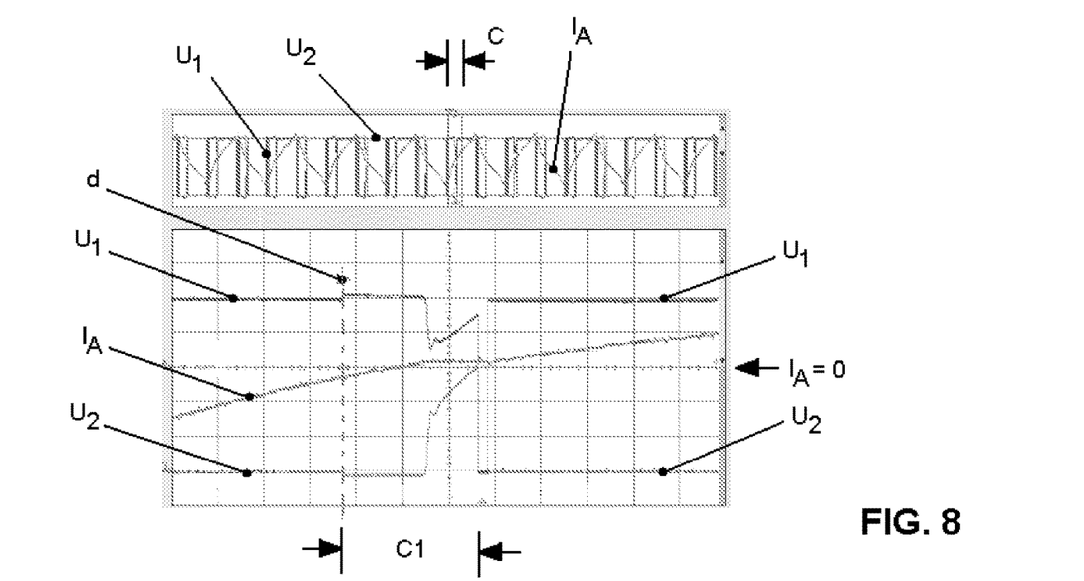
FIG. 8 measured courses of coil current and coil voltages at medium speed with motor load.

FIG. 8 shows the oscillograms of the measured coil current IA and of the coil voltages U1, U2 measured at the terminals of coil A, also at a medium motor speed, but with motor load and a resulting displacement or magnification of the load angle, wherein the start of the FD-phase again leads to the jump points in the course of the coil voltages U1, U2 marked with a dotted line d, and the end of the passive FD-phase results in a steep drop in the coil voltage U1.

The time range marked with the letter "C" in the upper part of FIG. 8 is again shown expanded in the lower part.

Within the time range C1, i.e. within the passive FD-phase activated by the timer T, the actual coil current IA is partially fed back to the supply voltage source, and thus an actually activated attenuation takes place.

In addition, by activating the passive FD-phases in the zero crossing of the target coil current ISollA, the actual coil current IA is much more pronounced and reaches the zero current in a more defined way.

Figure 9:
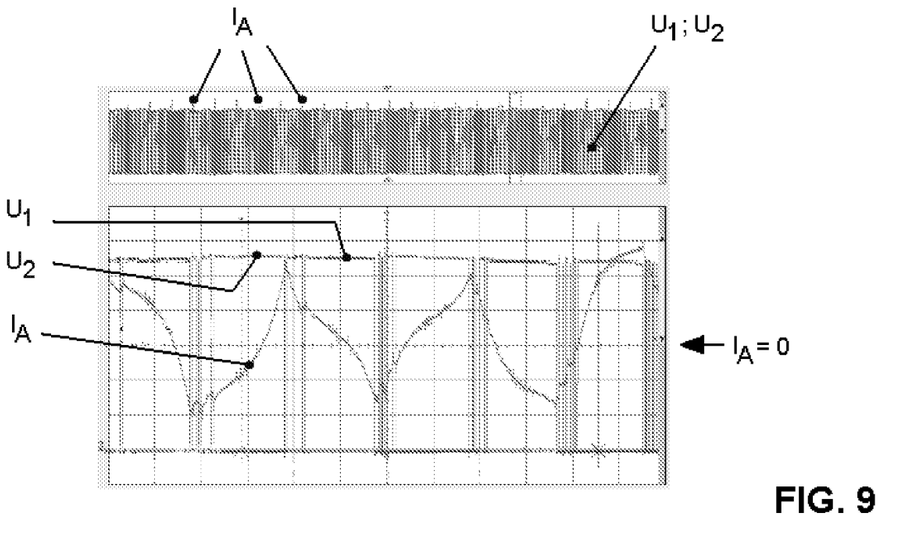
FIG. 9 measured courses of coil current and coil voltages at high speed with resonances.

FIG. 9 shows the oscillograms of the measured coil current IA and the coil voltages U1, U2 measured at the terminals of coil A at a high motor speed without activating passive FD-phases.

In this case, the motor is in a resonant oscillation state, wherein the course of the coil current IA is distorted due to the associated load angle oscillations and differs from cycle to cycle due to the oscillations. In the worst case, this operating state can lead to a resonance catastrophe.

Figure 10:
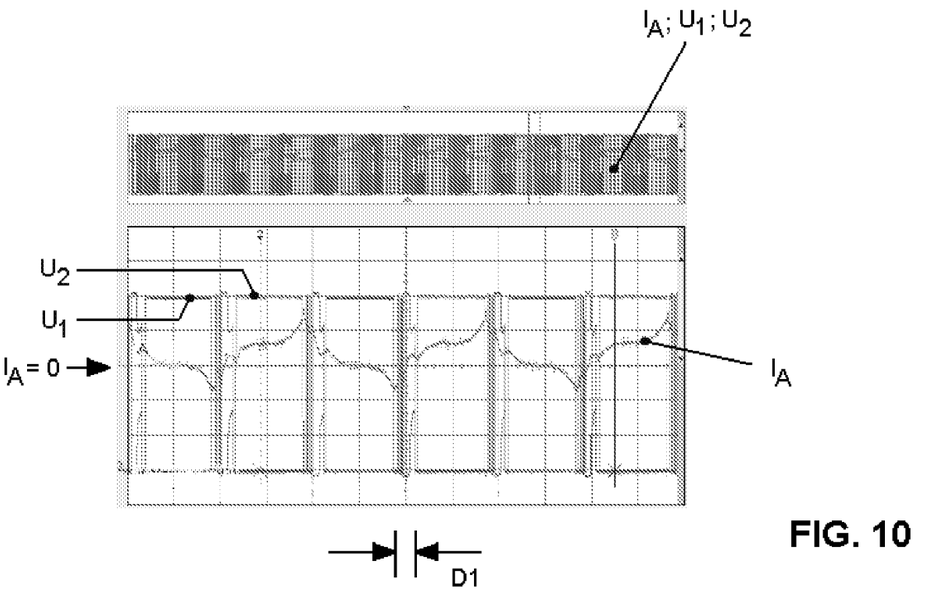
FIG. 10 measured courses of coil current and coil voltages at high speed without resonances.

In comparison to this and in the same scales, FIG. 10 shows the oscillograms of the measured coil current IA and the coil voltages U1, U2 measured at coil A again at a high motor speed, but with activated passive FD-phases.

The term "D1" indicates the range of a passive FD-phase activated by the timer T. By this and in comparison to the operating state shown in FIG. 9, a large part of the oscillation energy is absorbed, and the coil current IA only has considerably lower amplitudes and reaches a zero current much more pronounced and defined.

The invention claimed is:

1. A method for damping stepper motor resonances, comprising:
   connecting motor coils of a stepper motor into a bridge circuit comprising semiconductor switches,
   applying a supply voltage of a supply voltage source to the motor coils in order to impress into the motor coils target coil current values which are predefined for each point in time and which have a predefined polarity, the target coil current values are compared with a predetermined threshold value, a timer is activated when the amount of the target coil current values falls below the predetermined threshold value; and activating a passive fast-decay phase (FD-phase) at medium and high motor speeds for a period of time determined by the timer in a zero crossing or in a time range surrounding the zero crossing of the predefined target coil current for each motor coil, during which passive FD-phase all the semiconductor switches are open or switched blocking, in order to thereby feed a coil current flowing in the related motor coil back into the supply voltage source either via inverse or body diodes intrinsically existing in the semiconductor switches and/or via diodes connected in parallel to the semiconductor switches in the reverse direction between the positive supply voltage and ground potential.

2. The method according to claim 1, wherein the passive FD-phases are activated when the counter-EMF of the motor reaches or exceeds the level of the supply voltage.

3. The method according to claim 1, wherein the passive FD-phases are temporally activated in such a way that they have a temporal portion of between about 5% and a few 10% of the temporal duration of an electrical period of the target coil current.

4. The method according to claim 1, wherein the passive FD-phases are activated independently of the motor speed.

5. The method according to claim 1, wherein the passive FD-phases are also activated when the motor performs a speed change per time unit exceeding a predetermined limit value.

6. The method according to claim 1, in combination with a chopper method known per se, wherein the current values predetermined for each point in time by a target coil current supplied for each motor coil are impressed into each of the motor coils by driving the related bridge circuit (Br1, Br2) by means of PWM current pulses.

7. The method according to claim 1, wherein the passive FD-phases are activated by a switching signal which is generated by a detector (D) which detects a zero crossing or a temporal range surrounding the zero crossing of the predefined target coil current.

8. A circuit arrangement for damping stepper motor resonances, comprising:
   motor coils of a stepper motor each connected into a bridge circuit comprising semiconductor switches, via which a supply voltage of a supply voltage source is adapted to be applied to the motor coils, in order to impress into the motor coils target coil current values which are predefined for each point in time and which have a predefined polarity, by correspondingly opening and closing of the semiconductor switches by means of switching signals,
   a detector for detecting a zero crossing of the supplied target coil current of each motor coil,
   a timer (T) which is activated by the detector, the detector compares the supplied target coil current values with a predetermined threshold value, the timer being activated when the amount of the supplied target coil current values falls below the predetermined threshold value, and
   a switching device with which, at medium and high motor speeds for a period of time determined by the timer, all the semiconductor switches are open or switched blocking, in order to thereby feed a coil current flowing in the related motor coil back into the supply voltage source either via inverse or body diodes intrinsically existing in the semiconductor switches, and/or via diodes connected in parallel to the semiconductor switches in the reverse direction between the positive supply voltage and ground potential.

9. The circuit arrangement according to claim 8, wherein the semiconductor switches are MOSFETs.

10. The circuit arrangement according to claim 8, wherein the temporal duration determined by the timer is predetermined or adjustable by a user.

11. The circuit arrangement according to claim 8, wherein the timer is a monoflop.

12. The circuit arrangement according to claim 8, wherein the timer generates a control signal during the determined temporal duration, which is fed to the switching device, the switching device interrupting the chopper switching signals fed from the outputs of the chopper circuit during the application of the control signal, and instead applying a zero crossing signal to the inputs of the driver circuit, by means of which zero crossing signal all semiconductor switches are opened or switched blocking.

\* \* \* \* \*